United States Patent [19]

Beebe

[11] 4,002,266
[45] Jan. 11, 1977

[54] SEED DECELERATING DEVICE

[75] Inventor: Raymond A. Beebe, Detroit, Mich.

[73] Assignee: Massey-Ferguson Inc., Detroit, Mich.

[22] Filed: Jan. 28, 1974

[21] Appl. No.: 437,432

Related U.S. Application Data

[63] Continuation of Ser. No. 280,682, Aug. 14, 1972, abandoned.

[52] U.S. Cl. .............................. 221/260; 221/278
[51] Int. Cl.$^2$ ......................................... B65H 5/22
[58] Field of Search ............ 198/76; 221/278, 260, 221/211

[56] References Cited

UNITED STATES PATENTS

| 2,737,314 | 3/1956 | Anderson | 221/135 |
| 3,176,881 | 4/1965 | Malby et al. | 222/177 |

Primary Examiner—Stanley H. Tollberg
Attorney, Agent, or Firm—Robert L. Farris

[57] ABSTRACT

A seed planting device wherein seeds are carried at high velocities from a central selecting and dispensing unit to individual row units, each row unit has a rotating device that positively decelerates the seeds sufficiently to avoid bouncing of the seeds when they engage the ground and at the same time avoids materially changing the spaced relation between the seeds.

11 Claims, 6 Drawing Figures

SEED DECELERATING DEVICE

This is a continuation of application Ser. No. 280,682, filed Aug. 14, 1972, and now abandoned.

This invention relates generally to planters and more particularly to mechanisms for controlling the speed or velocity at which seeds engage the ground during planting.

It is well known to distribute seeds to a plurality of row crop units from a central seed dispensing unit. Such apparatus permits the use of a large central seed hopper and a single dispensing mechanism. In order to convey the seeds from the seed selector to the individual row crop planting units, it has been proposed to utilize air pressure to convey the seeds to the row units. The conveying is done through tubes which connect to the central seed dispensing and propelling unit.

In order that the seeds be propelled the full distance from the centralized seed hopper and dispensing unit to each of the row units, it is necessary that the seeds be given a high velocity, that is the air pressure must convey the seeds along at a speed sufficient to carry them through the tube in a manner such that the spacing between the individual seeds remains relatively constant. The high velocity given the seeds becomes a disadvantage when the seed is actually discharged by the row unit to the ground, the high velocity of the seed causes the same to bounce off the ground and either actually bounce out of the furrow that has been opened for the seed or for the seeds to be irregularly placed in the furrow with the spacing between the seeds not being uniform.

It is therefore an object of the present invention to provide an apparatus carried by the row unit which acts to reduce the velocity of the seeds prior to their being discharged on the ground. It is a further object of the invention to provide such an apparatus that will positively reduce the speed of the seeds and yet act on the seeds in a manner so as not to damage the same or to change the relative spacing between the seeds. These and other objects of the invention will be more apparent from the following description and accompanying drawings, in which.

While the invention is shown and described in a specific embodiment, it is to be understood that the invention is not limited to the construction shown and that alternative arrangements are within the scope of the invention and are intended to be covered herein.

Figure 1:
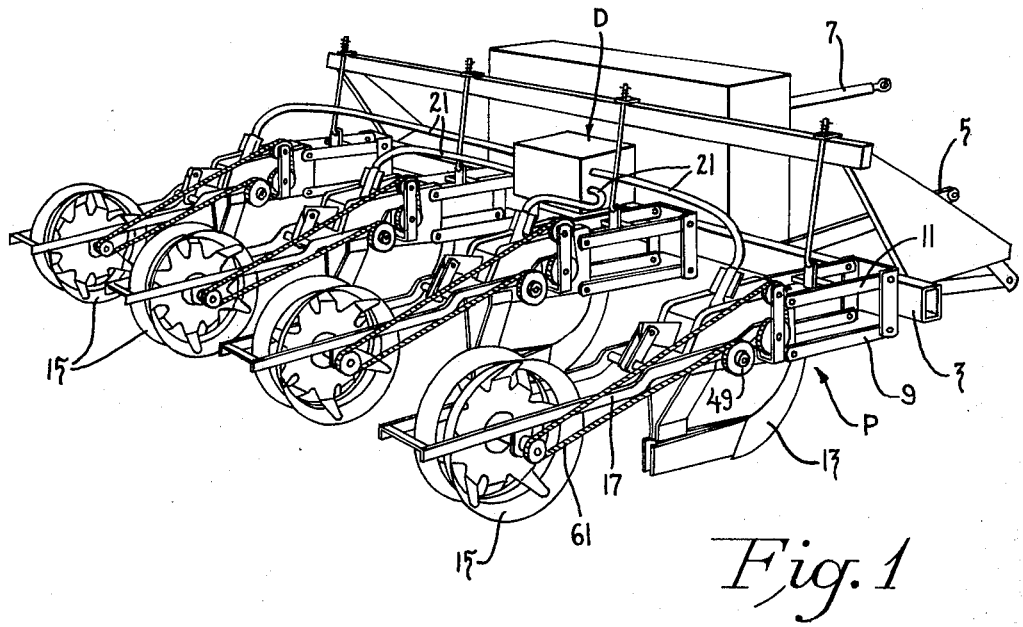
FIG. 1 is a perspective view showing a plurality of row units connected to be drawn by a single tool bar and connected by seed feeding tubes to a centralized seed dispensing unit.
Figure 2:
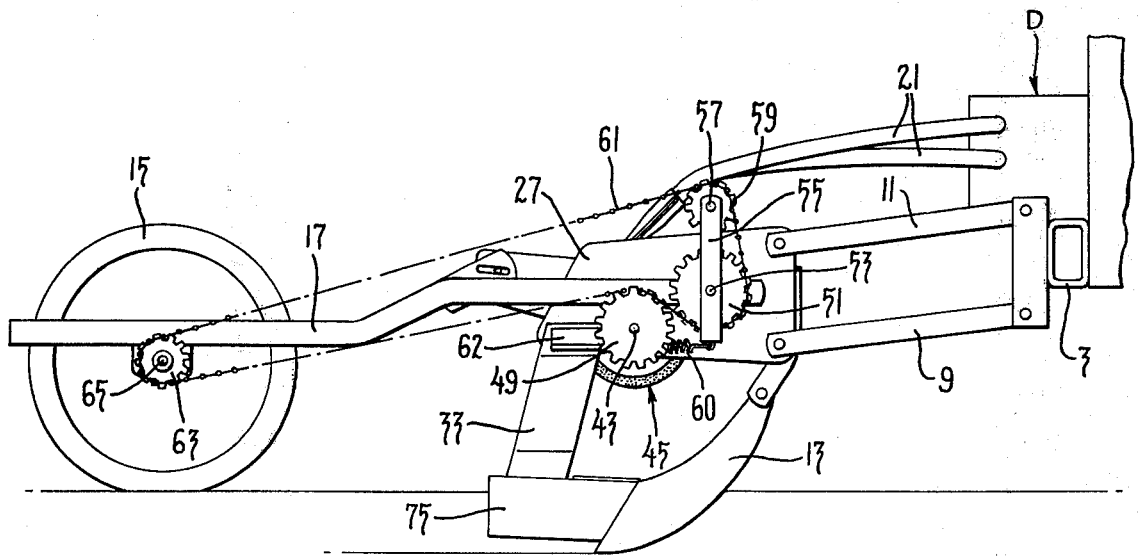
FIG. 2 is a schematic view showing an individual row unit and showing schematically the apparatus for reducing the speed or velocity of the seed prior to depositing the same on the ground.

Referring now to FIG. 1 which schematically and diagrammatically shows a planter unit which includes a tool bar 3 that includes fixed mechanism for connecting to the lower links 5 and top link 7 of the tractor. The tool bar carries a central seed holding hopper and dispensing unit generally designated D. The dispensing unit, which forms no part of the invention, may be of any suitable type which selects individual seeds and propels them by means of air through tubes to individual row units.

Connected to the tool bar 3 are a plurality of individual row planting units P which are carried on the tool bar by means of parallel links 9 and 11 which permit the row units to move up and down relative to the tool bar. Each planter unit includes a furrow opening apparatus 13, and a press wheel 15 rotatably carried on a draw bar 17 that is connected to the main portion of the planter unit. Individual tubes 21 lead from the dispensing unit D to each of the planter units to convey the seeds propelled from the dispensing unit D to the row unit. Referring now to FIGS. 3 – 7, it will be seen that the row units include a pair of side plates 27 and 29 which are joined together at their forward portion by the furrow opener support brackets 31 and at their rearward end by the rear furrow opener support brackets 33.

A plate 35 also connectss the side plates 27 and 29 and carries thereon a rearwardly extending member 37 which acts through a cross beam 39 to fix the angle of the press wheel draw bar 17 relative to the planter unit. The draw bars 17 extend forwardly and are connected together at cross shaft 41 which passes through a slot 42 in the side plates.

Figure 3:
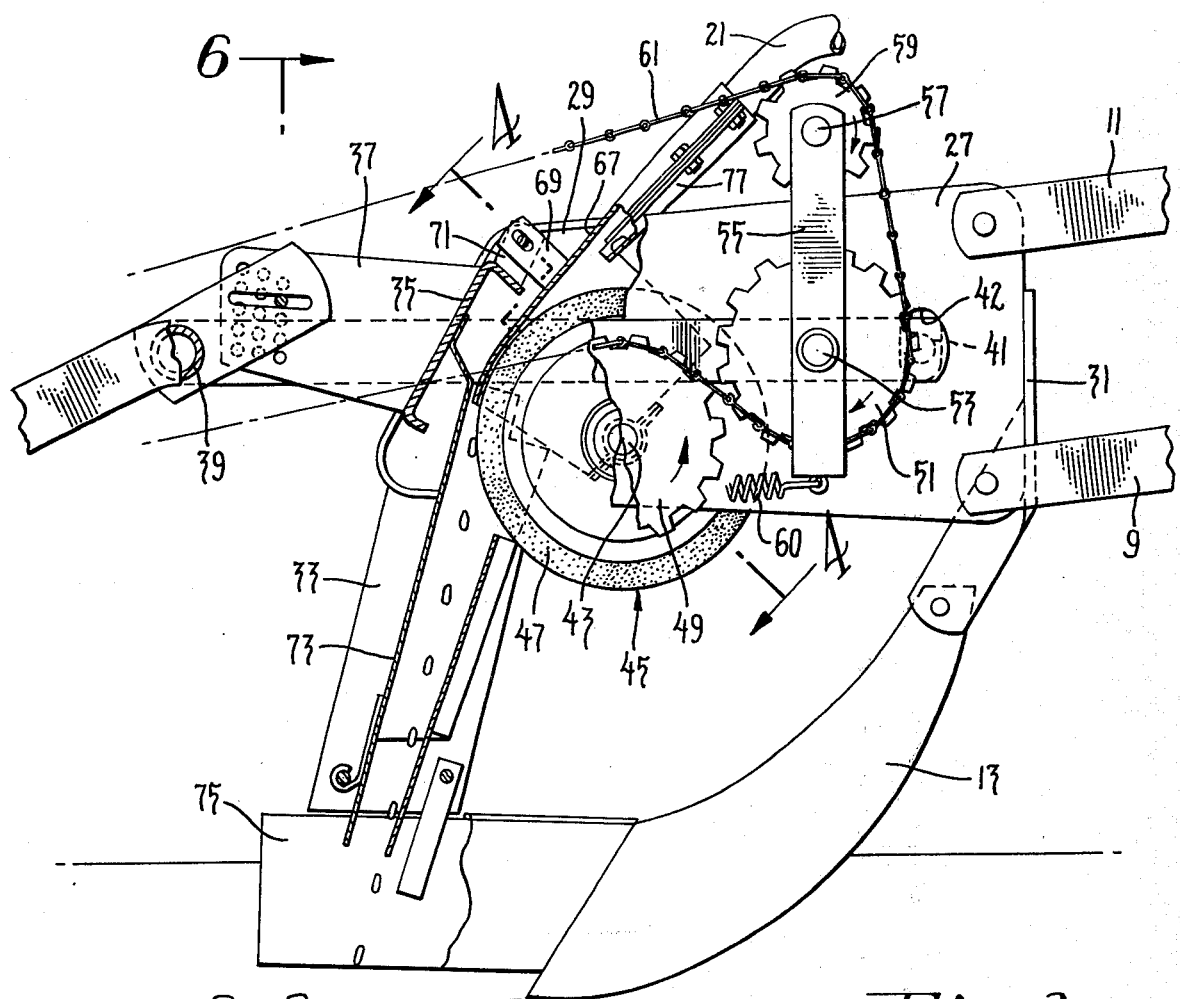
FIG. 3 is a detailed elevational view of a row crop unit showing details of the seed velocity reducing means.
Figure 4:
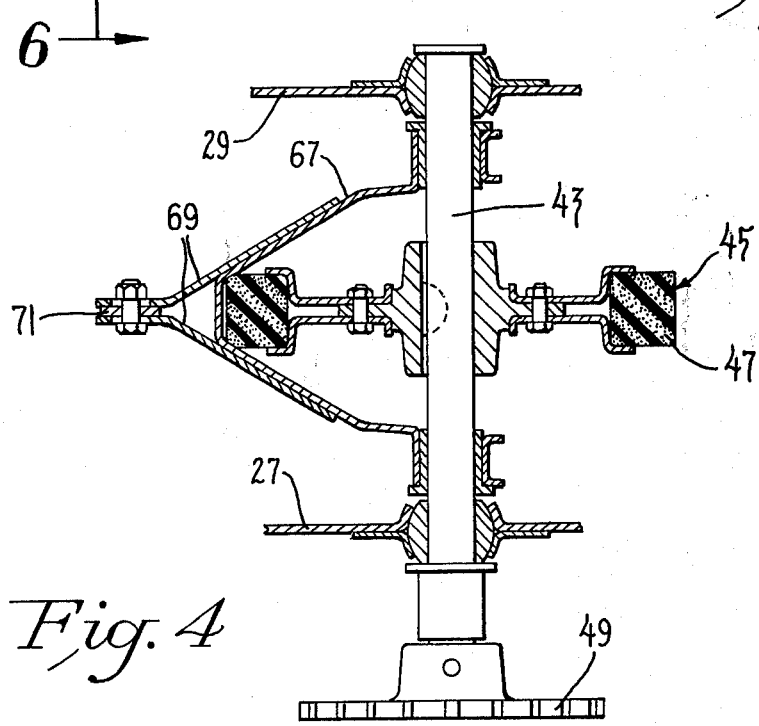
FIG. 4 is a sectional view taken through the lines 4 — 4 in FIG. 3.
Figure 5:
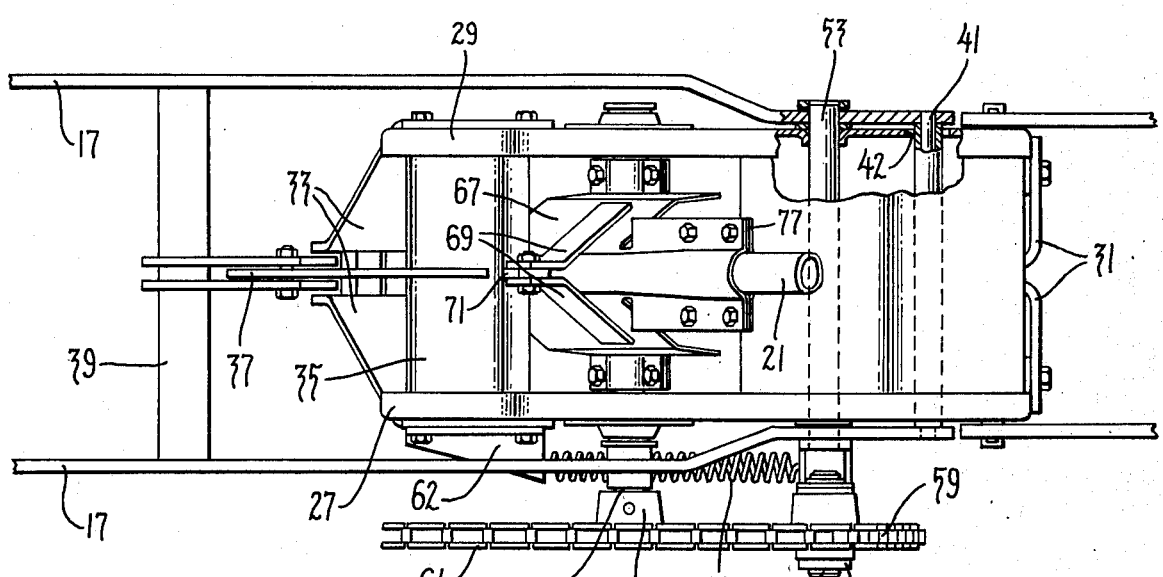
FIG. 5 is a plan view of the row unit.
Figure 6:
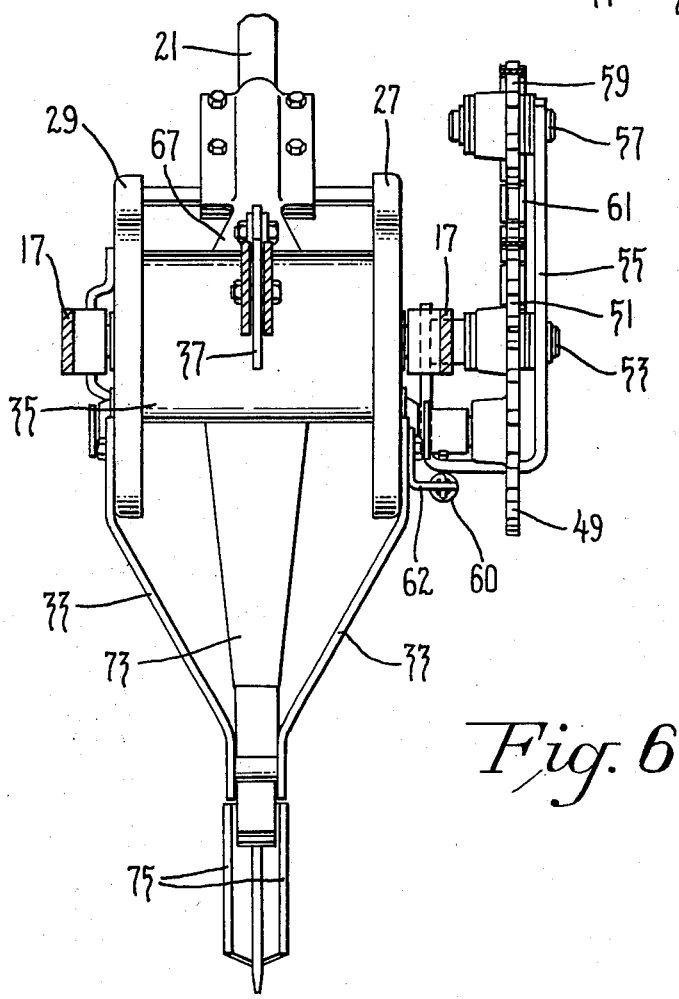
FIG. 6 is a rear view of the row unit.

Extending through the side plates 27 and 29 and carried by bearings attached to the side plates is a lateral shaft 43. As seen in FIGS. 3 and 4, a wheel member generally indicated 45 is secured on the center portion of the shaft 43. The outer portion or periphery of the wheel member 45 includes an annular flexible member 47 which in the preferred embodiment is formed of a soft material such as foam rubber or foam plastic without compartments in the periphery. Other types of material may be used in place of the foam rubber and the function of the soft material will be described later.

Shaft 43 extends through the side plate 27 and carries on the end thereof a drive sprocket wheel 49. In line with the sprocket wheel 49 is an idler sprocket wheel rotatably mounted on a shaft 53 which extends through the draw bar links 17. A sprocket wheel support arm 55 is carried on the shaft 53 and extends upward to support a shaft 57 carrying another idler sprocket wheel 59. A spring 60 is connected to the lower end of the arm 55 and to a bracket 62 attached to the rear furrow opener support brackets 33. Brackets 33 are in turn connected to side plates 27.

A chain 61 extends around the top sprocket wheel 59, the lower idler sprocket 51 over the top of the drive sprocket 49 and rearwardly to wrap around a drive sprocket 63 which is secured to the shaft 65 on which the press wheel 15 is mounted. It will be seen that rotation of the press wheel 15 causes rotation of the sprocket 63 and consequent movement of the chain 61 to rotate the drive sprocket 49 on the shaft 43. The spring 60 acts to tension the chain 61 by urging the idler sprocket 59 forwardly.

The annular flexible member 47 on the wheel unit 45 rides in a V-shaped trough formed by member 67. The trough member 67 is journaled on the shaft 43 and is retained by a pair of brackets 69 which are adjustably attached to a flange 71 attached to the cross piece 35. The trough member 67 extends upwardly and forwardly and is formed to receive the end of the hose or tube from the selecting and dispensing apparatus D. As seen in FIG. 3 the trough unit is curved to form an arcuate surface adjacent to the periphery of the wheel unit 45 and forms with the annular flexible member 47 of the wheel a limited passage through which seeds can only move by compression of the annular flexible member 47 as seen in FIG. 3.

Between the rear furrow opener support brackets 33 is a seed dispensing tube 73 which is rectangular in configuration and reduces from a relatively large cross section at the top to a relatively narrow cross section at the lower portion between the side plates 75 of the furrow opener. The seed dispensing tube 73 is supported at its rear lower portion by means of a pin extending through the side plates 75. The trough member 67 is formed at it upper end with a portion 77 which aids in directing seeds passing through and from the hose or tube 21 and directs the same tangentially to the outer periphery of the wheel member 47 so that the seeds move with their high velocity into the limited area between the outer periphery of the annular flexible member 47 and the adjacent surface of the trough 67. The decreasing space between the annular flexible member 47 and the arcuate portion of the trough 67 permits catching of the seeds and slowing of the same to the peripheral speed of the wheel unit 45. Suitable openings for the escape of air are provided between the end of the portion 77 and the wheel unit 45. In the preferred embodiment shown, the wheel unit 45 rotates at approximately one fourth of the peripheral velocity of the press wheel 15 and consequently the peripheral speed of the wheel and of seeds carried by the wheel is one fourth of the ground speed that the planter is traveling.

OPERATION

As the planting unit is drawn by the tractor, individual seeds are dispensed at spaced intervals into the hoses 21 by the dispensing means D. The seeds are propelled at a high velocity in order to insure that they are carried to the row units and remain in a relatively fixed or uniform spacing. The seeds from the tubes 21 enter into the trough member 67 and are directed into the space between the wheel unit 45 and the trough 67. The seeds are slowed down to the peripheral speed of the wheel unit 45 which as stated above in the preferred embodiment is approximately one fourth of the ground speed. As the wheel turns the seeds are carried along until they reach the end of the arcuate portion of the trough and fall into the chute member 73 which guides the same into the furrow that has been opened by the opener 13. The press wheel 15 passes over the furrow and closes the earth over the furrow covering the seeds that have been placed in the furrow.

While the seed velocity reducing means has been shown as a single wheel which engages the seeds against a stationary arcuate portion, the apparatus may be constructed utilizing a pair of wheels, one of which is driven and the other which idles and each wheel having a soft rubber portion so that the seeds are carried between the two wheels and are slowed to the proper speed. Likewise, a conveying belt or other longitudinally moving member may be used to engage the seeds to slow the same to the proper speed. The important requirement is that the means not damage the seed and yet positively engage the same to slow the seed from its high velocity to the relatively low velocity required so that the seed does not bounce when it engages the ground.

Again, while the velocity reducing apparatus is shown driven from the press wheel, the speed reducing means could be driven by other suitable devices such as an electric or hydraulic motor, an air driven motor. The important requirement is that the speed of the reducing mechanism be at some predetermined speed such that the velocity of the seeds is sufficiently reduced so as to reduce bouncing and yet at the same time continue to carry the seed toward its depositing in the furrow.

What is claimed is:

1. Apparatus for conveying seed from a seed dispenser to the ground and for reducing the velocity of moving spaced seeds prior to impact of said seeds on soil including conveyor means for conveying seed in moving air at a given velocity, means for positively lowering the given velocity of said seeds and passing the seeds along a path at a velocity less than said given velocity and openings for the escape of at least a portion of the air in which the seed is carried to the means for positively lowering the velocity of the seeds.

2. The apparatus of claim 1 wherein said apparatus comprises a pair of members having adjacent surfaces, the surface of at least one of said members being driven in the same direction as the seeds are moving but at a reduced rate, the surface of said one driven member having means thereon for positively slowing seeds in contact with the same to the speed of said one driven member whereby seeds entering between said surfaces are slowed to the velocity of said one driven member.

3. The apparatus of claim 2 wherein said adjacent surfaces of said members are spaced apart a distance less than the thickness of said seeds and wherein said surface of said one driven member is sufficiently flexible to allow said seeds to depress said surface enough to permit said seeds to pass between said members.

4. The apparatus of claim 1 wherein said apparatus comprises a pair of spaced members having adjacent surfaces normally spaced less than the thickness of said seeds, one of the members being relatively stationary and the other member being driven in the same direction as the moving seeds but at a reduced velocity and having a relatively flexible surface that will depress upon seeds being trapped between said surfaces to permit said driven member to slow the velocity of said seeds while continuing to move the same toward the ground.

5. The apparatus of claim 4 wherein said driven member is a rotating wheel having a flexible outer periphery and said stationary member has an arcuate surface conforming to the periphery of said wheel.

6. The apparatus of claim 4 wherein said members constitute a pair of axially spaced rotatable wheel members movable at speeds such that their peripheries are moving at a velocity less than the velocity at which said seeds move, the peripheries of the wheels at their closest point being spaced less than the thickness of said seeds, and the periphery of one of said wheels being sufficiently flexible so as to allow seeds passing between said wheels to deform the latter periphery and be positively carried at the speed of the periphery of the driven wheel member.

7. A seed planting apparatus including means for selecting individual seeds and propelling the same to a row unit including seed planting means, said row unit carrying means for receiving individual seeds traveling in a tube with air at a given velocity, for reducing the velocity of said seeds prior to being deposited on the ground so as to eliminate bouncing of the seeds and for depositing the seeds on the ground and openings for the escape of at least a portion of the air in which the seed is carried to the means for positively lowering the velocity of the seeds.

8. The apparatus of claim 7 wherein said means for positively reducing the velocity of said seeds comprises a driven member which positively engages the seeds and reduces their speed.

9. The apparatus of claim 8 wherein said driven member is driven by ground engaging means carried by said unit at a speed proportional to the speed the planting apparatus is moving over the ground.

10. The apparatus of claim 7 wherein said means for positively reducing the velocity of said seeds comprises a pair of members having adjacent surfaces, one of said members being positively driven at a speed less than the speed of said seeds in said tube means for directing the seeds from said tube between said surfaces, the surface on said one driven member being flexible to conform to the seed to engage the same to reduce its velocity and carry it between the adjacent surfaces, means for receiving seeds from said means for reducing the velocity of the seeds and conveying the same to the ground.

11. The apparatus of claim 10 wherein said one driven member constitutes a rotating wheel having a flexible periphery forming said flexible surface and wherein said other member constitutes a stationary member having a surface conforming to the periphery of said wheel, said flexible periphery and the latter surface being spaced apart less than the size of said seeds.

* * * * *